March 24, 1936. J. SCHMIDT 2,034,993
GREEN CORN CUTTER
Filed Sept. 30, 1932 8 Sheets-Sheet 1

Fig. 1.

March 24, 1936.                    J. SCHMIDT                    2,034,993
                                GREEN CORN CUTTER
                             Filed Sept. 30, 1932              8 Sheets-Sheet 2

John Schmidt
By
FHGraham
Attorney

March 24, 1936.　　　　J. SCHMIDT　　　　2,034,993
GREEN CORN CUTTER
Filed Sept. 30, 1932　　　8 Sheets-Sheet 3

Inventor
John Schmidt
By
Graham
Attorney

March 24, 1936.  J. SCHMIDT  2,034,993
GREEN CORN CUTTER
Filed Sept. 30, 1932  8 Sheets-Sheet 4

Inventor
John Schmidt
By
Attorney

March 24, 1936. J. SCHMIDT 2,034,993
GREEN CORN CUTTER
Filed Sept. 30, 1932 8 Sheets-Sheet 5

Inventor
John Schmidt
By
Graham
Attorney

March 24, 1936. J. SCHMIDT 2,034,993
GREEN CORN CUTTER
Filed Sept. 30, 1932 8 Sheets-Sheet 8

Inventor
John Schmidt
By
Attorney

Patented Mar. 24, 1936

2,034,993

UNITED STATES PATENT OFFICE 2,034,993

GREEN CORN CUTTER

John Schmidt, Buffalo, N. Y., assignor to Food Machinery Corporation, San Jose, Calif., a corporation of Delaware Application September 30, 1932, Serial No. 635,679

17 Claims. (Cl. 130—9)

This invention relates to a machine for cutting green corn from the cob for canning purposes and is especially designed as a universal machine for cutting all of the several styles of corn put up into cans by commercial canners.

There are normally three styles of corn known in the trade, they are, cream style corn wherein the tops of the kernels are cut off and the pulp from the remaining kernels scraped from the cobs, which make a mixture of small top kernels and a mass of pulp and milk or corn juices, to which milk or water or brine may be added as the corn is prepared for canning.

Another style of corn is that wherein the kernels are cut through the centers first removing the tops of the kernels and then the remaining kernels are cut off close to the cob. This style is substantially all small kernels but the pulp is more or less exposed. This manner of cutting makes small kernels out of large kernel corn.

Then there is the style known as whole grain or whole kernel corn wherein the kernels are cut from the cob as close to the cob as can be done without removing too much of the cob surface and chaff. By cutting the kernels close to the cob practically none of the kernel pulp leaves the kernels during the treatment and preparation of the corn for canning.

Heretofore separate machines have had to be purchased by the canner to produce these different styles of corn, and especially so if whole grain corn was to be canned.

In this machine there has been provided a series of operating heads set in axial alignment, all of the same size and general characteristics so that they are substantially interchangeable in their various locations and also interchangeable as to replacement or substitution for producing the various styles of corn mentioned.

This machine is also universal in another respect in that the operating elements are so designed, proportioned and placed that the machine will successfully handle all shapes and size ears of green corn without change or adjustment. This unusual condition is possible on account of certain structural characteristics, relative speeds of operative elements and means for controlling the ears of corn during their passage through the machine.

Due to the special construction adopted for the several operative elements of the machine it has been possible to keep its size down to an unusual dimension, the whole machine being very much smaller than other machines for doing only a part of the things this machine will do.

Special attention has been paid to the design of the operative elements so that none of the corn juices can gain access to the working parts neither can any of the lubricating materials escape from their spaces and reach the corn, so that contamination from these causes is almost entirely eliminated.

Green ears of corn in prime condition for canning are more or less delicate and the kernels are easily bruised or the skins ruptured so that the juices escape and gradually soil the machine and impair the general quality of the finished product. The various operating elements for guiding and removing the kernels have been so proportioned, assembled and balanced that the minimum of pressure or abrasive action is transmitted to the ears in passing them through the machine, and in order to give the various operating parts time for successive functioning the ears of corn are advanced through the machine at successively increasing speeds.

More detailed features of invention reside in providing revolving cutter heads and revolving scraper heads and means for feeding the ears through said heads in axial alignment therewith for producing cream style corn.

Providing a revolving primary cutting head, a revolving secondary cutting head, and means for feeding the ears through the heads for producing the double cut or cut kernel corn.

Providing a revolving corn cutting head, ear guides and depth of cut guides mounted on and revolving with the head for producing the whole grain style of corn.

Providing means for feeding the corn through the several operative heads at progressively increasing speeds.

Providing a revolving cutter head carrying kernel cutting knives and knife opening members connected together so that they move in unison.

Providing a revolving corn cutting head having knives and knife opening members mounted to revolve with the head, the knife opening members being located in advance of and outside of the knives so that silk released from the passing ears will not pile up on and between said knives and knife opening members and impair their action.

Providing a revolving cutter head having knives and knife opening members mounted to revolve therewith, the cutting edges of the knives being at substantially right angles to the angle of the spiral which they describe when cutting kernels from the cobs.

Providing a revolving corn cutting head carrying knife and knife opening members, the cutting edges of the knives being slightly wider than the widths of the paths cut upon the ears.

Providing a revolving corn cutting head carrying knife and knife opening members thereon with means for regulating the depth of cut by changing the relation of said knives and knife opening members.

Providing a revolving cob scraping head having scrapers mounted thereon and having opening members associated therewith to open the scrapers to accommodate differing sizes of cobs.

Providing a revolving scraper head having scrapers mounted thereon the scrapers being arranged to scrape the corn in overlapping, adjacent spiral paths.

Providing revolving operative elements mounted to run in annular grooves so that lubricant will be held in the grooves by centrifugal force.

Providing revolving operative heads carrying cutting and gauging members and interconnecting means for giving simultaneous movement to said members with equalizing devices associated therewith to balance and control the centrifugal forces set up by the rotation of said heads.

With such objects in view as well as other advantages inherent in the invention, the novel structural peculiarities novel organization of elements, and the separate and collective operations involved in carrying out the recited objects of the invention, which will be made the subject matter of claims appended hereto, it is to be understood that the several necessary elements and combinations constituting the same may be varied in their proportions, placement and general arrangement and operative relation without departing from the scope and nature of the invention. In carrying out the objects of the invention in a concrete form or machine, further objects, advantages and improvements have been evolved than have been recited, and in order to make the invention more clearly understood there are shown in the accompanying drawings means and mechanism embodying the preferred structural arrangement and the preferred disposition of the different parts and combinations but wherein is shown only one way of embodying the creative part or concept of the invention. The described devices are simply embodiments of the invention which other structures might also employ and some of the parts and combinations of parts may be used without the others in different types of such machines without departure from the purview of the invention, and I therefore regard myself as entitled to such variations from the described and shown devices as fall within the scope and meaning of the claims.

In the making of these drawings illustrating my invention embodied in a machine no attempt has been made to have the drawings accurate to scale, and some parts may be more or less exaggerated in size and relative placement to better show and illustrate the invention.

Referring now to the drawings

Figure 18 is a sectional view taken on substantially the line 18—18 of Fig. 15.

Referring now to the drawings a better and clearer understanding of the invention will be had.

Figure 2:
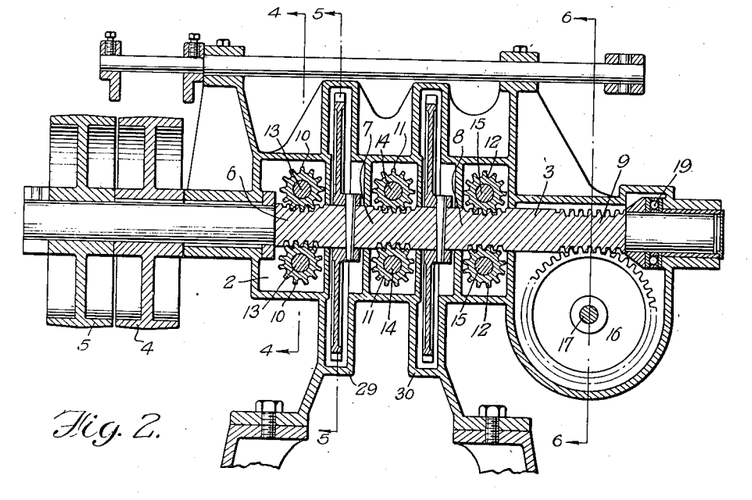
Figure 2 is a vertical sectional elevation taken on substantially the line 2—2 of Fig. 1.
Figure 3:
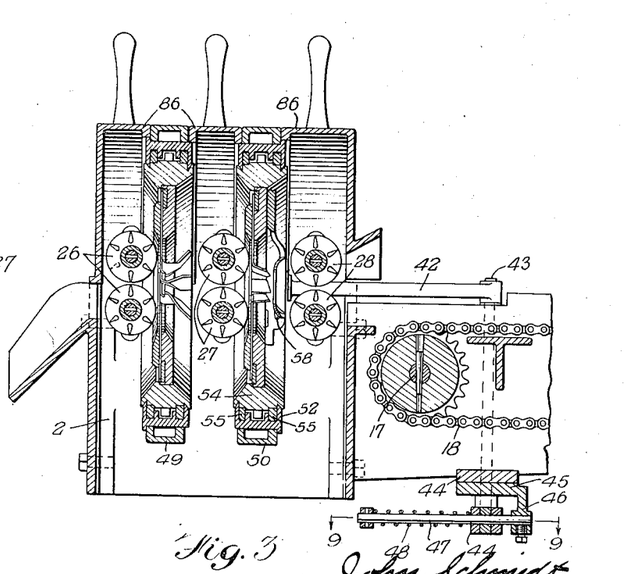
Figure 3 is a sectional elevation taken on substantially the line 3—3 of Fig. 1.
Figure 4:
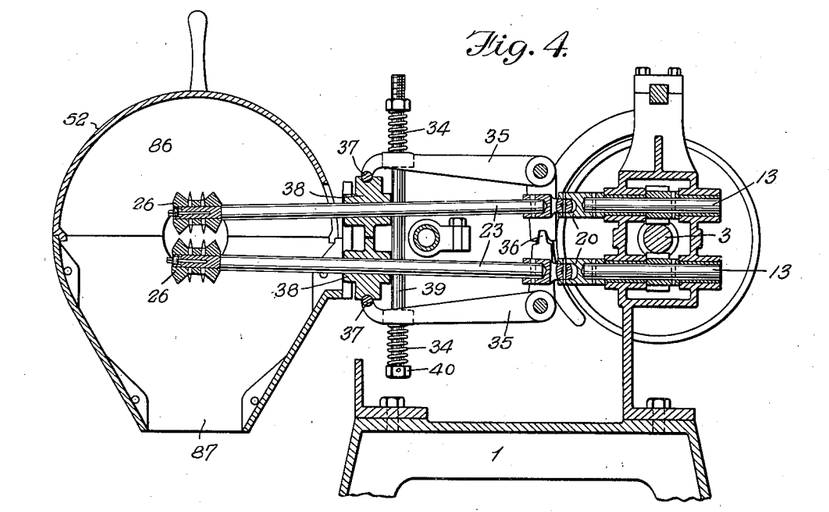
Figure 4 is a vertical sectional elevation taken on substantially the line 4—4 of Fig. 2.
Figure 5:
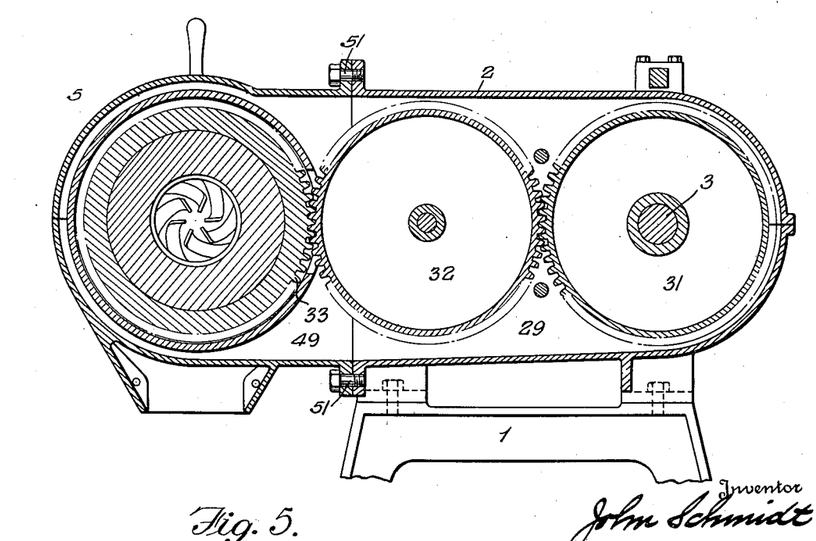
Figure 5 is a vertical sectional elevation taken on substantially the line 5—5 of Fig. 2.
Figure 6:
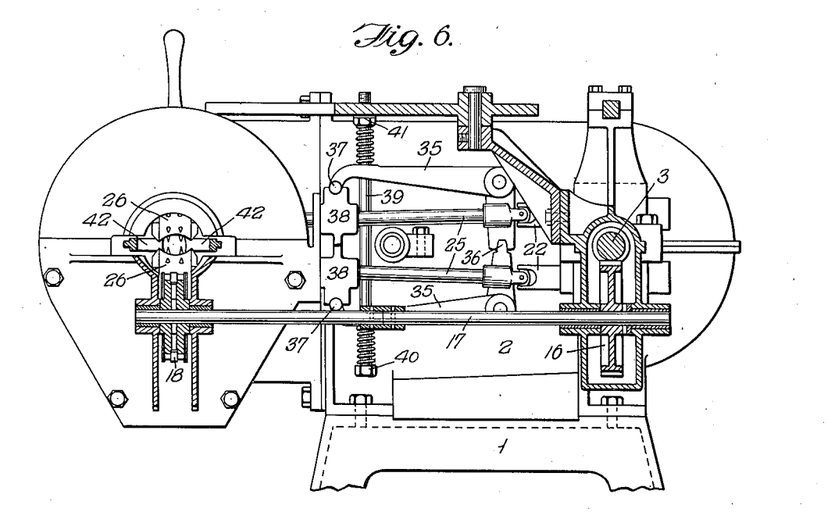
Figure 6 is a vertical sectional elevation taken on substantially the line 6—6 of Fig. 2.
Figure 7:
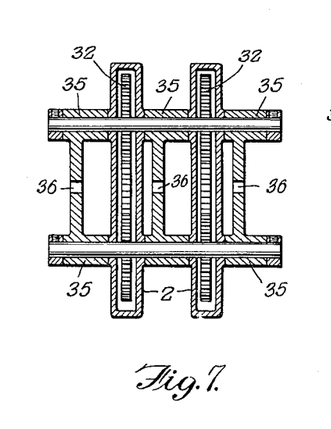
Figure 7 is a vertical sectional elevation taken on substantially the line 7—7 of Fig. 1.

The numeral 1, comprises a base consisting of legs and tie rods to form a secure and rigid support for the operative elements of the machine. A housing 2 is bolted to the base 1 and forms the complete enclosure for the operating parts. The housing at the rear of the machine as seen in Fig. 2, carries a main drive shaft 3, with tight and loose pulleys 4 and 5 on one end, and with worm section 6, 7 and 8 intermediate of the shaft and with a worm section 9 at the other end. The intermediate worm sections mesh with worm gears 10, 11 and 12, which in turn are secured to the short shafts 13, 14 and 15 as is best shown in Fig. 4. The worm section 9 meshes with the worm gear 16 which in turn is mounted on the shaft 17 which extends forward of the machine and drives the feed chain 18. A ball thrust bearing 19 takes the end thrust exerted on the shaft 3. Secured to the pairs of shafts 13, 14 and 15 are universal joints 20, 21 and 22 and extending to the head end of the machine are roll shafts 23, 24 and 25, each pair of shafts carrying feed rolls 26, 27 and 28. Housing extensions 29 and 30 run to the cutter head section of the machine and carry transfer gears as shown in Fig. 5. The gear 31 mesh with the gear 32 and it in turn mesh with the rotary head gear 33. This arrangement is the same in each housing extension 29 and 30 and forms the positive drive for the rotary heads. The feed roll shafts 23, 24 and 25 have restrained vertical movement occasioned by the passing of the ears of corn and cobs. In the normal inoperative positions of the shafts the rolls 26, 27 and 28 are resiliently held in substantially the positions shown in Figs. 3 and 4, but as ears of corn and cobs pass through, the rolls are opened by the ears or cobs against the resistance of the springs 34 and the crank arms 35 which are geared to move in unison as at 36 Fig. 4.

The ends of the bell cranks 35 are provided with trunnions 37 having bearing on the blocks 38 which are normally held in abutting relation as is seen in Fig. 4 but are free to expand and open the rolls when the ears of corn pass.

The tension rods 39 carrying the springs 34 have free movement through the bell cranks 35, the nuts 40 being pinned to the rods and the nuts 41 being adjustable on the rods produces the same tension on each bell crank so that at all times the feed rolls are operating under balanced tension.

Figures 8, 9:
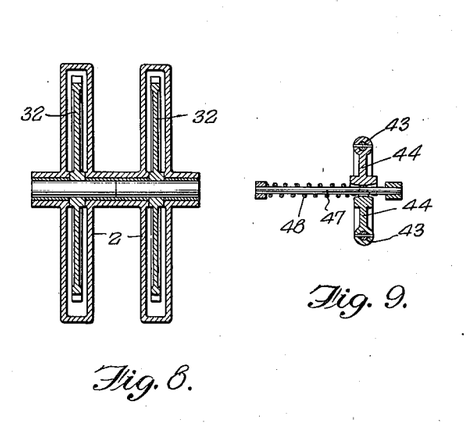
Figure 8 is a vertical sectional elevation taken on substantially the line 8—8 of Fig. 1.
Figure 9 is a vertical sectional elevational taken on substantially the line 9—9 of Fig. 3.

The feed rolls 26, 27 and 28 are of gradually increasing diameters so that the ears and cobs are given a successively increased speed of travel. The rolls 27 are slightly larger than rolls 28 so that as soon as they engage a cob it will be immediately moved a little faster, and rolls 26 are a little larger than rolls 27 so that when the cob reaches them its speed is again increased. This increase of speed is desirable to cause the cobs to move through the machine somewhat spaced apart. The increase of speed begins just as the ear enters the first feed rolls 28 which immediately advances it ahead of the following ear coming on the feed chain 18. A space between the ears and cobs is necessary to give the centering, cutting and scraping mechanism of the several heads to assume a closed position before the next ear enters their zone so that each ear and cob will be properly centered for treatment by each head before the mechanism of the head begins operating on the ear. The feed rolls 28 have curved surfaces which center the ears vertically, while the centering arms 42 tend to center the ears laterally. The arms 42 are pinned to the vertical shafts 43, these shafts extending down on the outside of the feed chute and finding bearing in the frame at Fig. 3. Secured to the lower ends of the vertical shafts 43 are control arms 44 Fig. 9 which are interlocked by one gear tooth so that the two shafts and all that they carry will move in unison. Secured to the lower face of the machine frame is a bracket 45 bolted thereto and carrying an angular extension 46 to which is secured a spindle 47 extending through a free hole in the arms 44. This spindle 47 carries a compression spring 48 which exerts a constant pressure on the mechanism and causes the centering ends of the arms 42 to normally rest in a closed position so that the ear of corn entering will open these centering faces against the tension of the spring 48. Figs. 3 and 9 show this mechanism.

The outer ends of the frame extensions 29 and 30 form bearings and supports for the cutter and scraping heads, these supports 49 and 50 are bolted to the ends of the extensions 29 and 30 as is seen in Fig. 5 at 51. Removing the bolts at 51 enables the removal of the complete head mechanism from either frame extension, and the replacement of other head mechanisms for cutting the different styles of corn.

Figure 3 gives a very good illustration of the construction of the head mechanisms and the manner of mounting and since the mounting of all heads is the same a description of one will suffice. Taking the first or cutter head in support 50, there is a ring member 52, see also Fig. 12, that is split centrally as at 53 so that the rotating head mechanism may be inserted in this support and bearing ring member 52. After the parts are assembled the complete head is inserted in the fixed support 50 and tightly held therein.

Figures 10, 11, 19, 20:
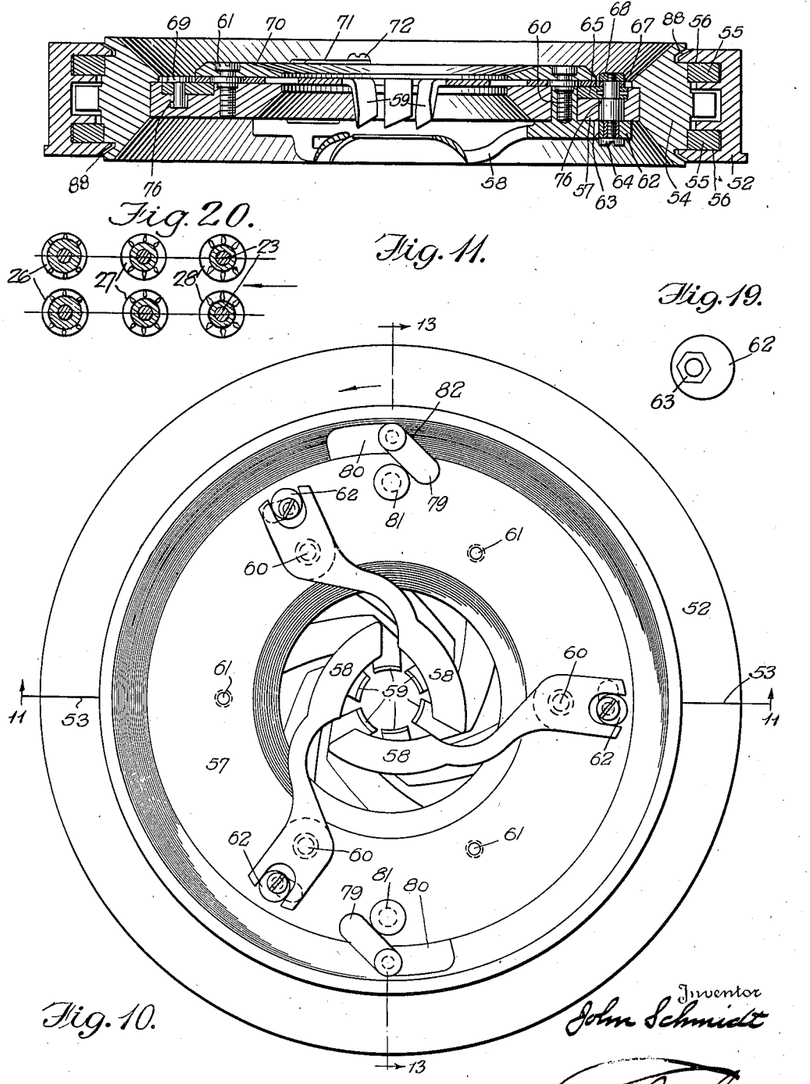
Figure 10 is a front elevation of a cutter head.
Figure 11 is a sectional view taken on substantially the line 11—11 of Fig. 10.
Figure 19 represents one of the eccentric bushings set on a hexagon stud by means of which the gauge members are adjusted relative to the cutters.
Figure 20 represents the series of feed rolls that are made progressively larger so as to accelerate the feed of the ears as they are passed through the machine.

In assembling the rotary elements of the cutter head mechanism the ring gear 54 carries the oil retaining rings 55, see Fig. 11, which rings 55 find bearing in the annular grooves 56 of the ring 52 and form a substantially oil tight fitting to prevent oil escaping from the bearing surfaces toward the center of the head and thus contaminating the passing corn and especially the cut corn that is thrown outward by the cutters. There is more or less axial thrust exerted on the cutter head mechanism as the ear of corn is forced into cutting contact with the knives and by providing the two rings 55 this thrust is better absorbed.

A ring 57 is mounted in ring 54 and is the supporting ring for both the ear gauging members and the cutters, the gauging members being mounted on the side to first receive the point of the ear of corn and the knives being mounted on the opposite side of the ring with their cutting edges extending through the center of the head close to the guide members so that the cut begins just as the end of the ear passes through the gauging members. There are three gauging members 58 and six cutters 59 to a set, the gauging member 58 being pivoted to the ring 57 at points 60 Fig. 10 and the cutters pivoted to the ring at points 60 and 61 but on the opposite side of ring 57.

The gauge members 58 are adjusted relative to the cutters 59 by means of the eccentric bushings 62 which set on a hexagon extension of the stud 63, Fig. 19, the eccentric bushing being held on the hexagon stud by the screw 64. The studs 63 are pinned to a spring controlled ring 65 set into an annular recess of the ring 57. The cutter blades on the opposite side of the ring 57, that is three of them, are also pivoted on the stud 60, Fig. 11, the other three being pivoted to similar studs as at 61 Fig. 11, which studs 61 are screwed directly into the ring 57. The three cutters that are pivoted on the studs 60 have slotted ends 66 that engage the bushings 67 held on the studs 63 by the nuts 68. The slotted ends of the other three cutter blades engage with studs 69 secured to the spring ring 65. The cutter blades are held against the ring 57 by a plate member 70.

Figures 12, 13, 14:
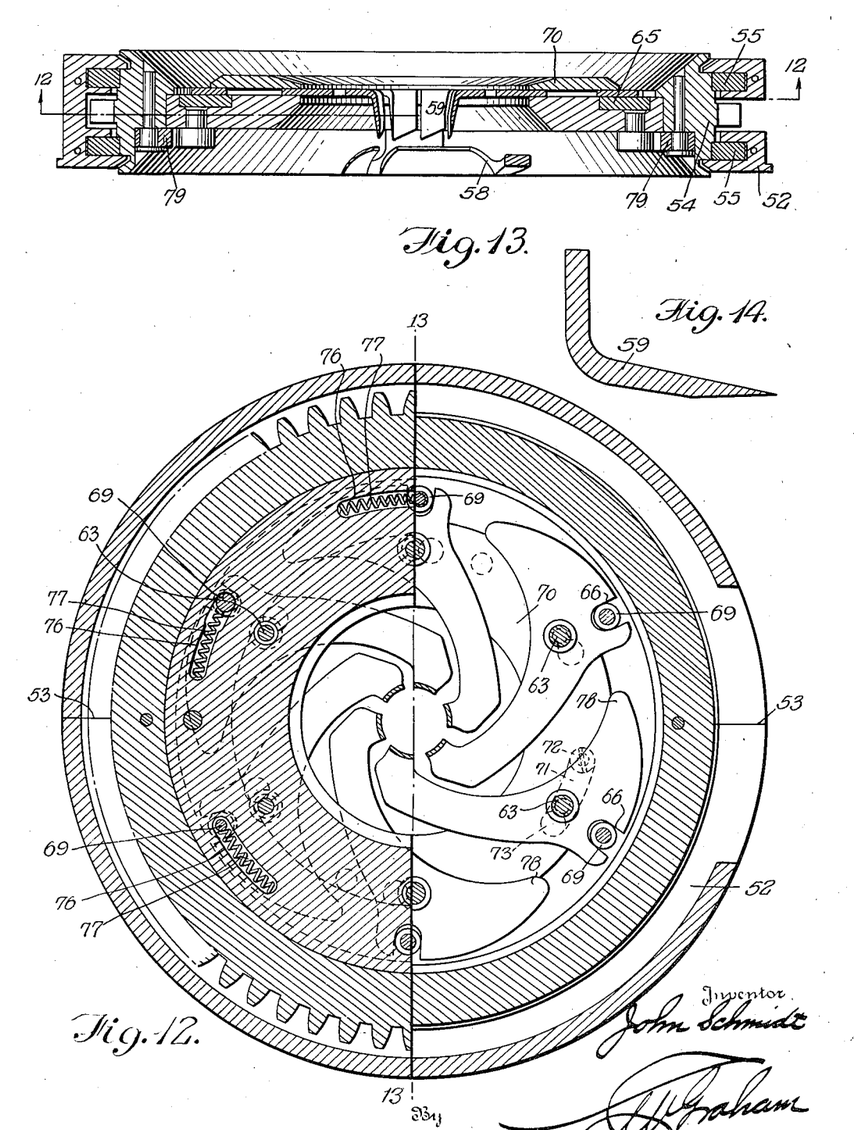
Figure 12 is a sectional view of a cutter head taken on substantially the line 12—12 of Fig. 13.
Figure 13 is a sectional view of a cutter head taken on substantially the line 13—13 of Fig. 12.
Figure 14 is an enlarged sectional view of one of the cutters.
Figure 15:
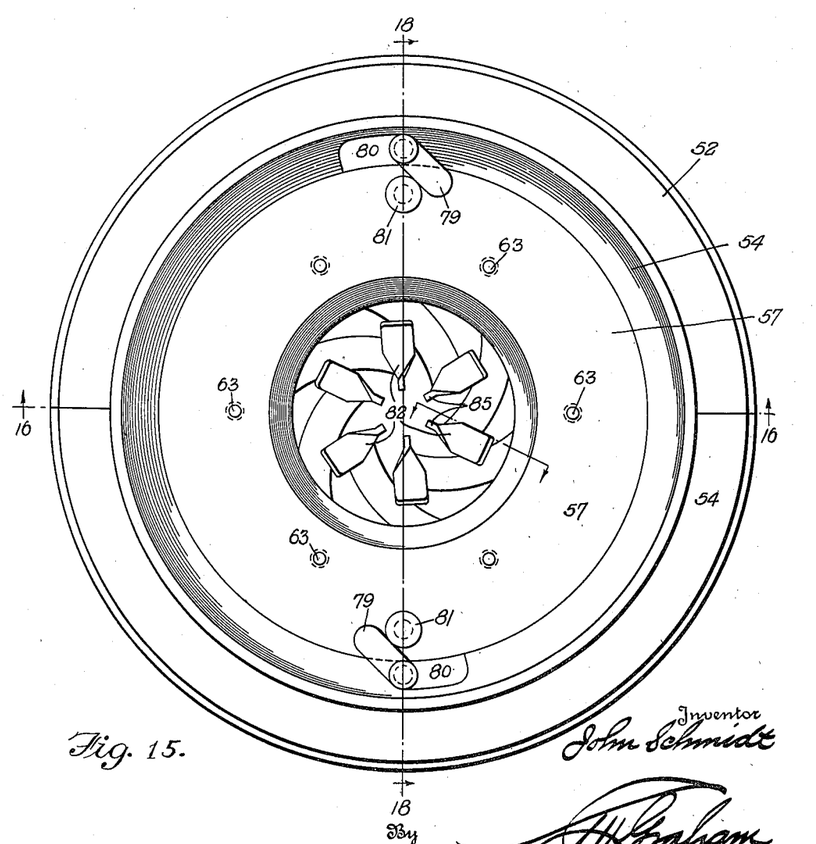
Figure 15 is front elevation of a scraper head.
Figure 16:
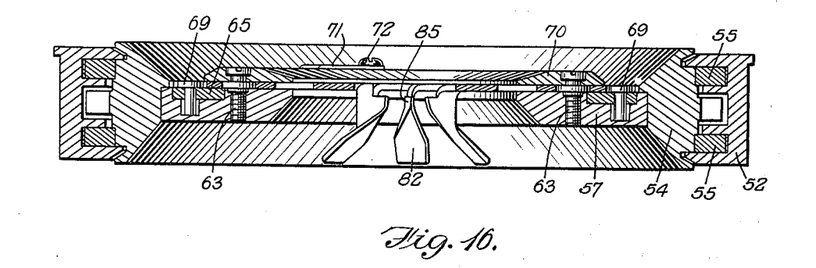
Figure 16 is a sectional view taken on substantially the line 16—16 of Fig. 15.
Figure 17:
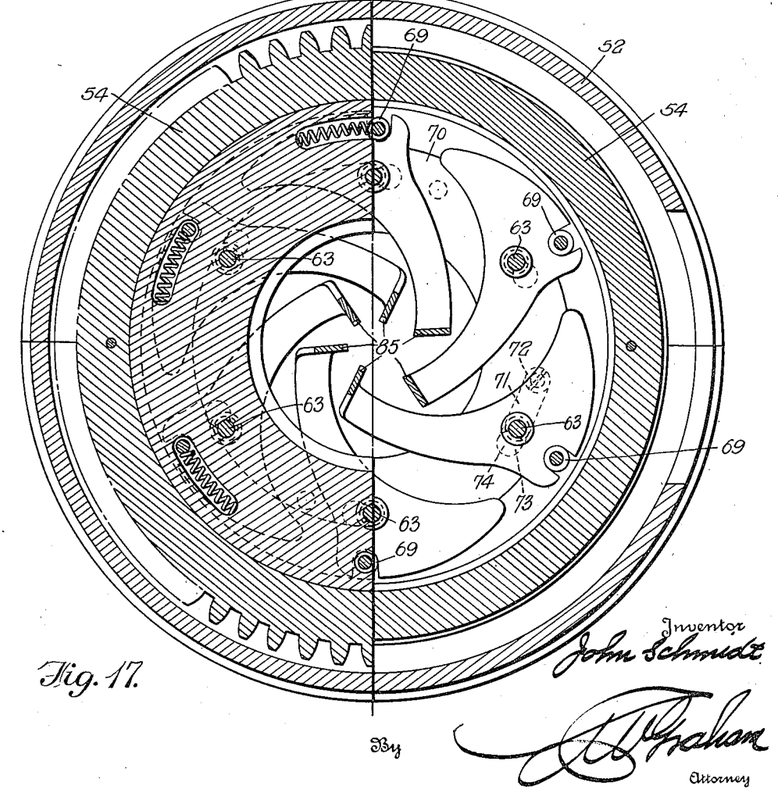
Figure 17 is a sectional view taken on substantially the line 17—17 of Fig. 18.

This plate 70 is shown in section in Figs. 11, 13 and 18 and a small section in plan in Fig. 17 wherein is shown a small locking member 71 which is secured to the plate 70 by the screw 72 and which has a pin or projection 73 which normally rests in the hole 74 in the plate 70 and bears against the head of the screw 61. The plate 70 has the slotted holes 75 large enough to pass the heads of the screws 60 and 61 so that when the plate is turned counter clockwise the plate can be lifted off and expose the cutters which can then be removed and replaced with others or for any other purpose. Before the plate 70 can be turned, however, the locking member 71 must be removed otherwise the plate is locked against rotation and insures the plate remaining in position during operation.

The ring member 57, shown in half horizontal section in Fig. 12 carries recesses 76 and springs 77. This being a fixed ring relative to the cutter and gauges and the studs 63 and 69 being fastened to the spring ring 65 and each bearing against one end of the springs 77 makes an assembly that causes all of the gauges and the cutters to open and close in iris fashion as the ears of corn pass through the head, since the ring 65 carries all of the studs 63 and 69 it moves all in unison as it is moved by the ear of corn bearing on the gauge ends of the gauging members.

It will be noted that there is considerably more metal in the gauging members and the knives from the pivots 60 and 61 to the center than there is outside of the center, although the knives have weighted ends 78 which tend to balance the metal on each side of the pivots. The springs 76, however, are tensioned so as to practically balance the ends of the knives and gauges while in rotation and under the influence of centrifugal force. This tensioning is so adjusted that just a slight pressure of the ear against the gauges as its point enters the zone of their rotation, will tend to open them and the knives to follow the contour of the ear. There can be only a slight tension necessary to do this in order to avoid abrading the tender surfaces of the kernels of the prime corn as it enters the gauging members. This condition might be termed a balanced operative equilibrium. This equilibrium is established in the manufacture and will not change during operation unless the springs 76 are changed or replaced with springs of different tension.

The ring member 57 being free to rotate in the ring gear 54 for removal therefrom and also having axial movement relative to the gear 54 when removal is desired some means must be provided for holding it in place and driving it in unison with the ring gear 54. This is accomplished through the medium of the drive members 79, Fig. 10 located in a recess 80 and pivoted to swing from the driving position as shown and lie enclosed in the recess 80. Driving is done through the stud 81 secured to the ring 57, the member 79 and the slot 80 being in and carried by the ring gear 54. The member 79 bearing against the abutment 82 makes a rigid driving member, but by swinging or turning the ring member 57 counter clockwise the pins 81 will be carried away from the driving members 79, when the members 79 may be swung around into the recesses 80 which will permit the ring member 57 and its whole assembly to be lifted out of the ring gear for repairs or replacement of parts.

The general structure of the scraper head as illustrated principally in Figs. 15, 16, 17 and 18 is substantially the same as the structure just described for the cutter heads, except that the scraper blades 82 replace the cutter blades 59. Their mounting and spring control is just the same as the cutter blades. There is no gauging structure on the side of the ring 57 as in the cutter head. In view of this similarity of structure it does not seem necessary to repeat the structure just described for the cutter heads. The drawings of these parts are clear and may be easily understood.

From now on it seems that an operative description will be more suitable and will disclose additional details of structure more clearly.

Operation

Figure 1:
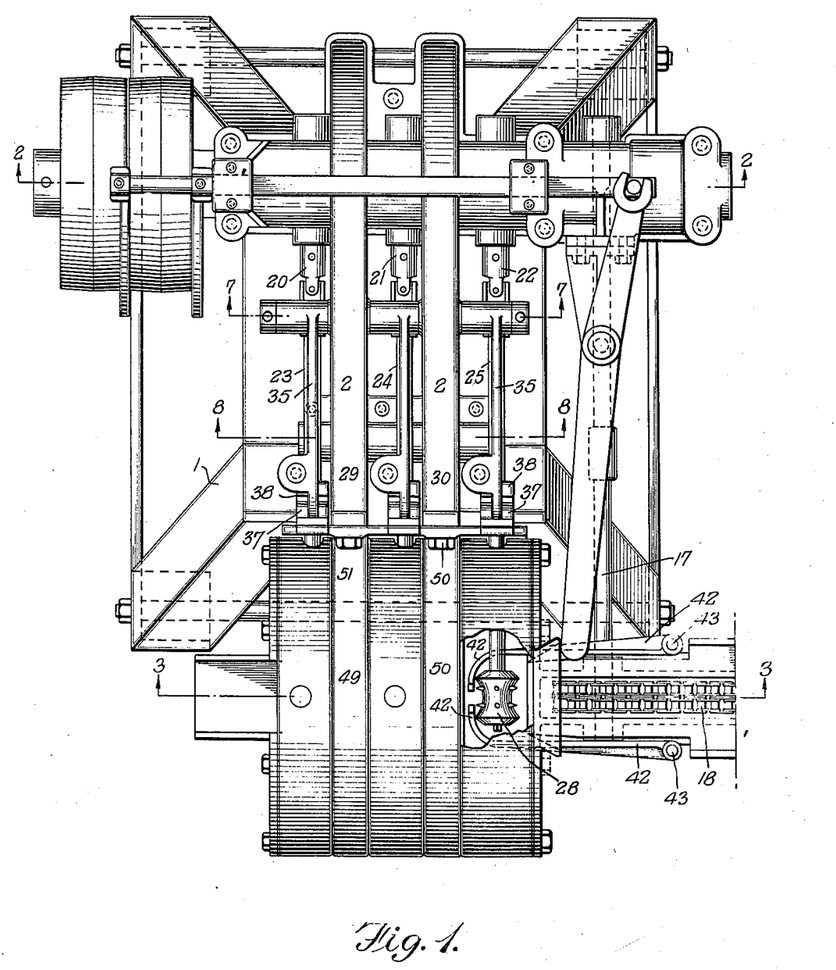
Figure 1 is a plan view of a machine embodying the invention.

Referring to Figs. 1 and 3. Green corn is husked and the butts cut off before the ears are fed to this machine. The ears are laid into the trough carrying the feed chain 18 with the tips ahead and as the chain 18 carries the ears forward the tips enter the feed rolls 28 which are speeded to move the ears a little faster than the chain 18, and they are moved forward through the centering gauges 42 and enter the zone of the rotating cutter head, the tips first contacting with the rotating gauging members 58 which will be opened iris fashion by the ear and the cutters opened according to their relative adjustment with the gauges. The machine is set to cut the cream style corn as shown in Fig. 3. As the ear is advanced by the feed rolls 28 the cutters begin to cut the kernels from the cob by a spiral path, and for the cream style corn they will cut the kernels about through the center, cutting off the tops of the kernels and as the ear advances it is engaged by the second set of feed rolls 27 and the axial speed is accelerated some to carry it ahead of the next oncoming ear and leave a space therebetween so the cutter elements and gauging members can assume their closed position before the next ear contacts with them. The first ear is passed through the scraping head which is rotating and the pulp is scraped from the lower kernel halves leaving the kernel skins adhering to the cob. The last set of feed rolls 26 engage the cob as it passes through the scraper head and again accelerate its axial speed to clear the next oncoming ear.

In some instances canners want to cut a larger portion of the top of the kernel off before scraping the pulp from the remaining kernel, and others may want to cut a smaller portion of the kernel tops before scraping.

The depth of cut on the kernel is controlled entirely by the relative adjustment of the gauging members and the knives, 58 and 59. This relative adjustment is accomplished by manipulating the small eccentrics 62 Fig. 10. With the adjustment as shown in Fig. 10 there would be a small top cut off the kernels. If it were desired to cut more of the top kernel off adjustment would be made by lifting the eccentrics 62 and turning them clockwise one sixth of a turn and reseating them on the studs 63, which have hexagon ends as shown in Fig. 19. The hegagon stud ends all being set in the same relation an adjustment of each eccentric one sixth of a turn will adjust the gauging members 58 to open slightly which will cause the knives to move less with the entering of the ear of corn and the cut into the kernels will therefore be deeper or in other words more of the tops of the kernels will be cut off.

If cut kernel corn is desired, where the kernels are cut in two giving a top kernel and a bottom half of kernel, the scraper head is removed completely and the scraper knives are replaced by cutters. The entire assembly of parts on ring 57 would be removed with ring 57 and replaced with another ring 57 with the cutters 59 and gauging members 58 which would convert the scraping head into another cutting head the same as the first head 50. The cut would then be gauged for each half of the kernels and the product would be the double cut or cut kernel corn of commerce.

Figure 3A:
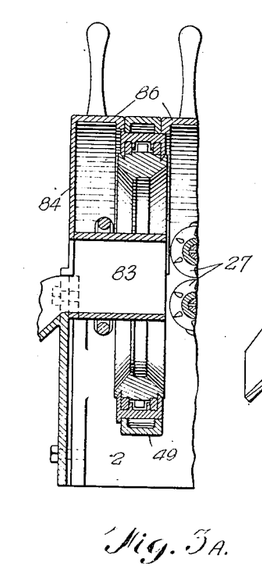
Figure 3A is on the same section line and shows a modification of a portion of Fig. 3.

If the style of corn known as whole grain corn is to be cut then the scraper head will be removed completely and simply a tubular member 83 Fig. 3A is bolted in the casing cover 84 for guiding the cobs from the machine.

In setting the cutters and gauges in the cutter head for cutting whole kernel corn the gauges will be set by the eccentrics 62 on the hexagon stud 63 to open the gauge iris so the points of the cutters will ride substantially on the cob surface. This will cut the kernels as closely to the cobs as is practical and not remove too much chaff. This adjustment will vary for different kinds of corn. Ears that have long kernels will have a maximum setting and ears having short kernels would have a minimum setting. The kernels on the same kind of corn do not vary so very much from small to large ears so that a setting to suit the average length of kernel for each kind of corn will be satisfactory for substantially all ears of that kind, and it is only necessary to change the setting when the kind of corn is changed and since each kind is run as a batch, usually, the changes in the setting of the gauges is not very frequent.

As has been mentioned in the detail description the comparatively high rotation speed of the cutter heads creates considerable centrifugal force in the pivoted cutter and gauging elements on the heads and in order to make the gauging and cutting movements of these parts sensitive and easily moved by the entering ear they are balanced under rotation by the springs 77 so that a slight touch of the ear to the gauging members will change the iris opening to suit that particular ear and permit the ear to be drawn through the cutter heads without any material abrasive action on the surfaces of the kernel which would tend to rupture the delicate skins and permit the kernel pulp and juices to escape.

The scraper head being of similar construction to the cutter head the action under rotation is substantially the same in that the centrifugal forces exerted by the scraper members are balanced by the springs 77 so that the tapered points 82 will open and close with a slight touch of the ears to adjust the scraper edges to give the desired scraping effect, and further the scraper edges are so arranged that the spiral paths they describe are overlapping so that the entire surface of the cob will be scraped. The scraper edges are designated at 85 Figs. 15 and 18.

The manner of oiling and controlling the distribution of the oil under rotation is an important feature of this invention. It is easily understood that oil should not be allowed to come in contact with the cut corn and thereby contaminate it. The design of the ring 52 which is fixed against rotation and the ring gear 54 which is provided with the oil retaining and thrust rings 55 is such that the centrifugal action of the oil in these and adjacent parts causes it to remain along and on the outer peripheries of the adjacent parts and thereby retains the oil on the inner and enclosed surfaces so that at no time does it escape from these surfaces to the outside of the cutter head. This action is likewise true of the scraper head.

In order to prevent the corn juices from seeping into the ring mechanism and mixing with the oil there are provided outwardly inclined notched, or beveled companion surfaces on the ring 52 and the ring gear 54 as indicated at 88, Fig. 11. It will be observed that there is a slight clearance between these beveled edges so that any corn juice that might find its way into these spaces would be immediately thrown out by the centrifugal force of the revolving heads, and during operation there would be no way for the juice to enter these spaces, which are annular.

Likewise the fit of the rings 55 is such that the centrifugal forces cannot throw any oil out of the bearing since none can reach the annular beveled grooves 88. This structure is an important feature of this invention.

Easily removable covers 86 are provided for the head end of the machine so that they may be removed at any time during operation to observe the action of the operative elements or for purposes of casual cleaning of the heads.

The kernels as cut are thrown outward and are caught by the casing and drop down through the casing and escape through the aperture 87 and drop into any suitable vessel or onto a conveyor for transport to some other machine.

There is a feature of construction in the fit of the revolving heads that should be mentioned. The ring gear 54, the sealing rings 55 and the housing 52 are fitted with a certain predetermined looseness that is not easily shown by drawings. When these heads are in operation there is a certain amount of heat generated due to the high speed and in order to compensate for the expansion due to this heat the parts are fitted so that the gear ring 54 and its attending parts float on a film of oil held in place by the centrifugal forces set up through the rotation. The expansion of the rotary parts due to the heat and the automatic centering of the rotating parts to find their center of rotation is permitted by the bevel faces 88 which are spaced apart to accommodate this action as well as the clearance on the outside edges of the sealing rings 55.

What I claim as new and desire to secure by Letters Patent is:

1. An apparatus for cutting green corn from cobs comprising a cutting head, a removable housing carrying said head and split bearings supporting said housing, gauging members and cutting members carried by said head, pivotal means for said gauging and cutting members, a single means connecting said gauging and cutting members and movable therewith under centrifugal force and resilient means controlling the movements of said gauging and cutting elements with means for rotating said head elements.

2. An apparatus for cutting green corn from the cob comprising gauging, cutting and scraping elements, rotary supports for said elements, removable housings carrying said rotary supports and split bearings supporting said housings, means for rotating said elements and said supports, means for counteracting centrifugal forces set up by said rotation and placing said cutting and scraping elements in substantially balanced equilibrium when under rotation.

3. An apparatus for cutting green corn from the cob comprising a series of rotating heads set in axial alignment, means carried by said heads for cutting kernels of corn from the cobs, rotary means having increasing diameters for feeding ears of corn through said heads at a gradually increasing axial speed.

4. An apparatus for cutting green corn from the cob comprising a series of rotating heads set in axial alignment, means carried by said heads for removing kernels of corn from the cobs, a series of pairs of rotary separate means for feeding ears of corn through said heads each of said separate pairs of means having increasing diameters for accelerating the speed of said ear in an axial direction.

5. An apparatus for cutting green corn from the cob comprising a series of rotating heads set in axial alignment, means carried by said heads for gauging and cutting kernels from the cobs, a series of feed rolls operating in pairs for feeding ears through said heads, each succeeding pair of feed rolls being larger in diameter to give accelerated speed to the ears as they are passed through said heads.

6. A cutting head for corn cutting machines comprising a fixed housing, a rotary element carried by said housing ring members on said rotary element interlocking with annular grooves in said housing, a detachable member carried by said rotary element, cutting and gauging elements carried on opposite sides of said detachable member whereby said cutting and gauging elements may be removed as a unit from said rotary element by the removal of said detachable member.

7. An apparatus for removing kernels of green corn from the cob comprising a rotary member, gauging and cutting elements carried thereby, said gauging and cutting elements having pivotal mountings and having their operative surfaces arranged circumferentially around the axis of said rotary member whereby they describe iris openings when under rotation, resilient means connected with said gauging and cutting elements to restrain said iris opening and bring said parts into delicate balanced equilibrium when rotating under operative conditions whereby they are rendered highly sensitive to further movement by contact with passing ears of corn with means for feeding the ears through said parts, and eccentric means for adjusting the operative relation of said gauging and cutting elements hexagonal means associated with said eccentric means to insure all being set in the same relative relation.

8. A gauging device for corn cutting machines comprising a series of gauging members located concentrically around an axis of rotation, pivotal mounting for said gauging members, eccentric devices engaging said gauging members directly hexagonal supports for said eccentric devices all disposed in like relation to said center of rotation whereby placement of said eccentric devices in like positions relative to said hexagonal supports will adjust all of said gauging members an equal amount relative to the axis of rotation.

9. A feed roll mechanism for corn cutting machines comprising a pair of feed rolls, shafts with spacer blocks supporting said rolls interlocked pressure arms for holding said rolls and shafts in normal position, a single rod passing through said arms, equalizing spring members on said rod and bearing against said arms, a fixed head on said rod and an adjustable nut thereon both contacting with said spring members whereby movement of said adjustable nut will adjust the tension of said spring members with equal tension at all times.

10. A cutting head for corn cutting machines comprising a fixed housing, a split bearing member in said housing, a ring gear member, a detachable member carried by said ring member, kernel removing elements carried by said detachable member on one side thereof and ear gauging members carried on the other side thereof, resilient means for holding said kernel removing elements and said gauge members in a normal closed relation, the centrifugal forces set up in said elements against the resistance of said resilient means during rotation tending to bring said kernel cutting elements and gauging members into delicate operative equilibrium so that ears of corn will pass through said gauging members without being bruised or abraded thereby with means for feeding ears of corn through said cutter heads with accelerating axial speeds.

11. An apparatus for removing kernels of corn from the cobs, a fixed housing, a split bearing in said housing, a removable rotary member carried by said bearing, means for rotating said member, a detachable assembly comprising a ring member carrying kernel cutting elements and ear gauging elements carried by said removable rotary member, pivoted means carried by said rotary member to lock and hold said cutter assembly therein and easily releasable to remove said assembly from said rotary member, said pivoted means also acting as drive member to move said detachable assembly in unison with said removable rotary member.

12. An apparatus for removing kernels of corn from the cobs, a housing, a split bearing in said housing, a ring gear carried by said bearing, a removable cutter and ear gauge assembly carried by said ring gear comprising a disk member having kernel cutting elements on one side and ear gauging members on the other side, a movable member secured to the said ring gear and engaging said disk member carrying the cutter and gauge elements to lock them in operative relation but easily movable to permit removal of the disk and cutter and gauge assembly from the ring gear member.

13. In a machine for removing green corn from the cob, a plurality of kernel removing devices arranged in spaced alignment, and means for feeding a file of ear corn through said kernel removing devices comprising a plurality of spaced feeding devices operable to receive successive ears and feed them endwise through said kernel removing devices in succession and at an accelerated rate of speed, whereby to separate said ears as they are advanced and cause the individual ears to pass through and clear of each successive kernel removing device prior to the introduction thereinto of the following ear.

14. A cutter head for corn cutting machines comprising an annular bearing, a ring gear rotatably journalled in said bearing, a cutting unit carried by said ring gear including a detachable ring member having cutting devices mounted thereon, and means for locking said ring member to said ring gear for rotation therewith, said means comprising a member pivoted to said ring gear and swingable to overlie said detachable ring member or to lie free thereof and an abutment on said detachable ring member against which said pivoted member rests when said members are locked to rotate in unison.

15. An apparatus for removing kernels of green corn from the cobs comprising a fixed housing, a rotary member carried by said housing and means for rotating said member, a detachable ring member carried by said rotary member, a locking block pivoted to said rotary member and swingable to overlie said detachable ring member or lie free thereof, an abutment on said ring member against which said swingable member rests when said members are adjusted in locked position to move in unison, gauging and kernel removing elements carried by said detachable ring member, a single means connecting said gauging and kernel removing elements to move in unison when actuated by a passing ear, means for restraining the movement of said elements and eccentric means for adjusting said elements relative to their operative relations.

16. An apparatus for removing kernels of green corn from the cobs comprising a housing, a rotary member carried by said housing, means for rotating said member, a detachable ring member carried by said rotary member, a locking block pivoted to said rotary member and swingable to overlie said detachable ring member or to lie free thereof, an abutment on said ring member against which said swingable locking block rests when members are adjusted in locked position to move in unison, means for movably securing gauging and kernel cutting means to said detachable ring member, means connecting said gauging and kernel cutting means to move them in unison, means restraining said movement but adapted to place said parts in balanced equilibrium when under rotative operation thereby rendering their operative adjustment by the passing ears of corn delicately sensitive to the ear diameter when contacting therewith so as not to abrade or damage the soft and tender kernels.

17. An apparatus for cutting green corn from the cob comprising a fixed housing, a rotatable ring member carried by said housing, a gear member around the periphery of said rotatable ring member, bearing rings around the periphery of said rotatable ring member and located one on each side of said gear member, annular grooves in said housing for the reception of said bearing rings and in which they rotate with said rotatable ring member, the said bearing rings in said annular grooves acting to absorb axial thrusts exerted on said rotatable ring member by the passage of ears of corn, said annular grooves acting to retain the oil or lubricant thrown to the periphery of said rotatable ring member by the centrifugal forces set up through the rotation of said ring member.

JOHN SCHMIDT.